(12) United States Patent
Gilley (10) Patent No.: US 6,249,582 B1
(45) Date of Patent: *Jun. 19, 2001

(54) APPARATUS FOR AND METHOD OF OVERHEAD REDUCTION IN A BLOCK CIPHER

(75) Inventor: James E. Gilley, Lincoln, NE (US)

(73) Assignee: Transcrypt International, Inc., Lincoln, NE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,180

(22) Filed: Dec. 31, 1997

(51) Int. Cl.⁷ .............................. H04L 9/28; H04L 9/06; H04L 9/26
(52) U.S. Cl. .............................. 380/28; 380/37; 380/42; 380/46; 380/262
(58) Field of Search .................... 380/28, 21, 37, 380/42, 43, 46, 48, 50, 283, 258, 260, 262, 265; 708/210, 250, 252

(56) References Cited

U.S. PATENT DOCUMENTS

| | | | |
|---|---|---|---|
| 4,078,152 | 3/1978 | Tuckerman, III | 178/22 |
| 4,160,120 | 7/1979 | Barnes et al. | 178/22 |
| 4,440,976 | 4/1984 | Bocci et al. | 179/1.5 R |
| 4,731,843 | 3/1988 | Holmquist | 380/29 |
| 4,754,482 | 6/1988 | Weiss | 380/48 |
| 4,815,130 | 3/1989 | Lee et al. | 380/50 |
| 4,827,507 | 5/1989 | Marry et al. | 380/38 |
| 4,972,469 | 11/1990 | Saltwick et al. | 380/2 |
| 5,054,067 | 10/1991 | Moroney et al. | 380/37 |
| 5,060,265 | 10/1991 | Finkelstein | 380/46 |
| 5,060,266 | 10/1991 | Dent | 380/49 |
| 5,068,872 | * 11/1991 | Schroter | 375/1 |
| 5,148,485 | 9/1992 | Dent | 380/46 |
| 5,191,610 | 3/1993 | Hill et al. | 380/21 |
| 5,195,136 | 3/1993 | Hardy et al. | 380/43 |
| 5,199,069 | 3/1993 | Barrett et al. | 380/28 |
| 5,214,694 | 5/1993 | Furuya et al. | 380/2 |
| 5,214,701 | 5/1993 | Quisquater et al. | 380/29 |
| 5,235,644 | 8/1993 | Gupta et al. | 380/48 |
| 5,274,707 | 12/1993 | Schlafly | 380/30 |
| 5,321,754 | 6/1994 | Fisher et al. | 380/48 |
| 5,365,588 | 11/1994 | Bianco et al. | 380/42 |
| 5,412,729 | 5/1995 | Liu | 380/37 |
| 5,420,928 | 5/1995 | Aiello et al. | 380/46 |
| 5,432,848 | 7/1995 | Butter et al. | 380/2 |
| 5,442,705 | 8/1995 | Miyano | 380/29 |
| 5,452,358 | 9/1995 | Normile et al. | 380/42 |
| 5,528,693 | 6/1996 | Leopold | 380/48 |
| 5,530,959 | 6/1996 | Amrany | 380/48 |
| 5,539,827 | 7/1996 | Liu | 380/37 |
| 5,561,713 | 10/1996 | Suh | 380/10 |
| 5,574,785 | 11/1996 | Ueno et al. | 380/2 |
| 5,604,806 | 2/1997 | Hassan et al. | 380/44 |

(List continued on next page.)

Primary Examiner—Tod Swann
Assistant Examiner—Justin T. Darrow
(74) Attorney, Agent, or Firm—Zarley, McKee, Thomte, Voorhees & Sease (57) ABSTRACT

An apparatus and method for reducing the overhead of a block cipher includes shortening the length of the initialization vector so that its length is less than the length of each block of information processed by the block cipher. The block cipher is utilized in cipher block chaining mode. The shortened vector is loaded into the block cipher with other pseudo-random bits. Cipher block chaining prevents the overall cycle length of the block cipher from decreasing. Thus, channel burden of repeatedly transmitting the initialization vector is reduced because it is shorter, but security is not unduly diminished because cycle length is not diminished. Late entry can be achieved. Also, combination of this method with coasting can increase accurate synchronization even in severely corrupted channels. Security level versus amount of vector shortening can be selected.

28 Claims, 3 Drawing Sheets

U.S. PATENT DOCUMENTS

| | | | |
|---|---|---|---|
| 5,606,322 | 2/1997 | Allen et al. | 341/173 |
| 5,606,616 | 2/1997 | Sprunk et al. | 380/29 |
| 5,613,005 | 3/1997 | Murakami et al. | 380/28 |
| 5,631,960 | 5/1997 | Likens et al. | 380/2 |
| 5,724,428 * | 3/1998 | Rivest | 380/37 |
| 5,910,907 * | 6/1999 | Chen et al. | 364/724.1 |

* cited by examiner

APPARATUS FOR AND METHOD OF OVERHEAD REDUCTION IN A BLOCK CIPHER

BACKGROUND OF THE INVENTION

1. Field of the Invention

The invention relates to transmission of encrypted information over a communications channel, and in particular, to an apparatus and method of reducing overhead in block cipher encryption and decryption without decreasing security of the content of the encrypted information below a desired level. Alternatively, the invention relates to reducing overhead in block cipher operations to produce a pseudo-random number sequence without decreasing security of the sequence. More specifically, this invention has to do with a way of reducing the burden of re-synchronizing a block cipher, regardless of application of the block cipher, without having to unduly sacrifice overall cycle length.

2. Problems in the Art

The need for secure communications systems continues to expand. It is many times desirable to keep data confidential from both innocent or intentional interlopers or viewers. It is also true of communications of voice.

Most communication of intelligible information is based on alphabetic or numeric systems. Therefore, the content of most data or voice messages is in one sense initially "coded". The English alphabet and the decimal number system are examples of such coding. By using the rules of those systems, the content of the data or voice can be immediately interpreted by those who understand the rules of and can "read" the information coded by that particular alphabet or number system. However, because the alphabets and number systems of the world are open and public domain, there is no substantial limitation on who can understand ("decode") the communication, and thus there is no substantial communication security for such.

A variety of methods have been developed to try to keep knowledge of the content of the information away from certain persons or entities. One example of a secure communications system is set forth in U.S. Pat. No. 4,893,339. Encryption is a well-known method of securing information. Encryption transforms the coded information into a form that is unintelligible when using the normal rules of the particular alphabet or number system originally used for that information.

A variety of encryption methods have been developed. Many function to output information that is made up of the same types of individual characters (letters or numbers) used to code the original intelligible message, but the output is unintelligible. Many operate at a digital level. The original intelligible coded information (e.g. alphanumeric words) is converted into digital words (e.g. bytes), with each character of each word being coded into a set of individual digital values (e.g. bits). Another example is audio (e.g. voice). Voice is converted to an analog electrical signal through a microphone. The analog signal is sampled. The samples are digitized by quantifying each sample digitally. Sections of audio (e.g. frames) can then be digitally quantified and used to reconstruct the analog signal.

In the above examples, the information can be immediately interpreted by those that intercept it by using compatible equipment, or by applying widely known techniques to make it intelligible. Therefore, many encryption methods concentrate on ways to make it difficult or practically impossible to derive the true meaning of the information from the encrypted communication.

One commonly used encryption method is called block cipher. The art of block ciphers is well known. The Data Encryption Standard (DES) is a common example of a block cipher, which is described in Federal Information Processing Standard FIPS-46-2, published by the National Institute of Standards and Technology. Furthermore, methods of using block ciphers to protect information are also well know. FIPS-81 describes methods of using DES in four different modes. FIPS-46-2 and FIPS-81 are incorporated by reference herein.

In conventional block cipher systems, the information to be encrypted is digitized. It can be digitally encoded data or voice (audio). This original, intelligible information is many times referred to as "plaintext", connoting that it contains the information that is intelligible and meaningful, i.e. it contains the message in an understandable form when decoded by easy methods. Block cipher systems tend to take chunks of digitally encoded information (fixed size sets of bits called "blocks") and combine each block with a block created by a pseudo-random number generator. The combined block, known as "ciphertext", is then unintelligible if decoded using conventional decoding techniques, unless it first is decrypted. This requires the receiving party to know ahead of time the identical pseudo-random number block used to transform the plaintext block to a ciphertext block. In communications systems, this means that the transmitter must tell the receiver certain information, apart from the message itself, to allow the receiver to know how to decrypt the message. Sources such as Schneier, Bruce, *Applied Cryptography, Second Edition,* John Wiley & Sons (1996) provide a discussion of cryptography and random numbers and their generation, and is incorporated by reference herein.

When using a cipher to protect communications traffic, certain features are highly desirable. First, the amount of overhead should be minimal. Overhead is data which is required for purposes other than that of sending the desired message, and may be necessary for such things as keeping the cipher at the receiving end in synchronization with the cipher at the transmitting end. Thus, overhead uses up room or bandwidth in a communication. More throughput of the actual message to be communicated can be achieved by minimizing overhead.

Second, the cipher should have a very long cycle before it begins to repeat itself. The overall cycle length refers to the number of pseudo-random bits a cipher can produce before repeating itself. Generally, the longer the overall cycle length, the more secure the cipher, because there are more possible bit combinations for each time a combination is generated. This is widely known and discussed in the Schneier book referenced above.

Of the various modes of operating a block cipher, cipher feedback (CFB) and output feedback (OFB) are the most popular for use in communications applications. One way in which CFB and OFB block ciphers are used is to input plaintext (containing the actual message to be communicated) into the block cipher. The output would be the ciphertext of the message to be communicated. Another use of these types of block ciphers is as a pseudo-random number generator. The pseudo-random numbers which are generated can be used to then encrypt digital data that contains the message to be communicated. The pseudo-random numbers could also be used for other purposes. For example, the pseudo-random number stream could be used as a rolling code for analog scrambling techniques such as frequency hopping, frequency inversion, or spectral rotation.

It is the use of a block cipher as a pseudo-random number generator (PRNG) that is addressed herein. The input to the block cipher will still be referred to sometimes as "plaintext" and the output "ciphertext", but it is to be understood that it is the output of the block cipher that is a secure pseudo-random number stream. In digital encryption, for example, when combined with digital data comprising a message, it creates the ultimate encrypted data message. This description will mainly discuss use as a PRNG in digital encryption, but it is not limited to such uses.

A block cipher makes an excellent pseudo-random number generator (PRNG) because it has a very long cycle time, offers many possible output sequences which are key dependent, and is totally deterministic, so that it is easy to construct multiple PRNGs which yield identical pseudo-noise or pseudo-random number (PN) bit streams. Furthermore, it is valuable, in the context of creating a high quality pseudo-random number stream that it also can be generated with high accuracy at a number of devices, either transmitters or receivers or both. Therefore, it is useful in such applications as telephone or radio systems where one or more receiving devices must generate the same pseudo-random number stream as the transmitting device.

When using a block cipher as a PRNG over a communications channel, it is critically important to establish and maintain precise synchronization at the bit level between the transmitter and the receiver. This is necessary because if the PRNGs are off by as little as one bit, the sequences produced will be out of synchronization (or "sync") and thus are useless for any application.

Frequently, one will use a PRNG to generate a PN sequence which can then be exclusive OR'ed (XORed) with some plaintext to yield ciphertext. In such an application, the PN bit stream is referred to as a keystream, which is not to be confused with the actual key used in the block cipher itself, which is also frequently referred to as the crypto variable (CV). An example of such an application is DES operating in OFB mode. In this case, DES is used to repeatedly encrypt an initialization vector (IV), with the resulting keystream being used to encrypt plaintext data. OFB mode operation of DES is well documented in a number of sources, including FIPS-81.

One primary problem with DES (or any block cipher) operating in OFB mode is that in addition to the requirement that both the transmitter and receiver must know the secret key or CV, they must also know the IV completely. This can be a problem when a cipher is used in a communications application. Consider a secure communications environment involving radio communications, where there is ordinarily one transmitter and many receivers. Frequently, some of the receivers will be unable to receive the beginning of a given message. If the message is encrypted, and if an initialization vector is sent only at the beginning of the message, then any receiver that misses the IV will be unable to decrypt the message. A prior art solution to this problem is to generate new IVs periodically throughout the message and send them, so that a receiver which did not receive the initial IV will be able to receive one of the subsequent IVs transmitted throughout the remainder of the message.

The ability of a receiver to join into a conversation already in progress is known in the art as late entry. Late entry allows a receiver to join or re-join a secure conversation in case sync has been lost or has never been initially acquired. Thus, in order to facilitate late entry when using a cipher in output feedback mode, it is simply necessary to transmit an initialization vector at periodic intervals throughout the message. In order for the IV to be useful to the receiver, it must be free of bit errors which are often caused by a noisy communications channel. Communicating the IV error-free between the transmitter and receiver is a significant burden in many systems. This is because the length of the IV is the length of the block for the block cipher. In the case of DES, many times this length is 64 bits. So for DES, a 64-bit IV will need to be sent at the beginning of a conversation, and periodically throughout the conversation at the points where late entry is desired. Of course, the IV must be received error-free, or the receiver will fail to construct the proper keystream and will thus be unable to decrypt the secure traffic.

Prior art systems have all required an error free IV to be transmitted periodically throughout the message in order to facilitate late entry. Because this can add a significant amount of overhead to a communications channel, it may require the use of error correcting codes, which can add further burden or overhead to the system, as can other techniques to try to make sure there are no errors, or errors are corrected or compensated, with respect to IV.

As can be appreciated, by repeating the IV throughout a message, overhead is increased. Also, there are a number of known methods in the art to attempt to ensure that the IV is received accurately by the receiver. However, such methods add additional overhead to the system. To greatly increase the probability of accurate receipt of IV, increasingly complex methods could be applied, but the increase in overhead would substantially increase the amount of room taken up in the communication and make it slower and more cumbersome.

Moreover, security of block cipher encryption is normally tied to length of IV. The longer the IV, the less susceptible the encryption is to attack. This is well known and documented. As mentioned previously, however, for the authorized intended recipient(s) of the transmitted message to actually receive it and be able to use it, the IV must be received bit by bit totally accurate. Although there are ways to make the transmitter and receiver both know IV without error, it is more difficult the longer the IV, especially under communications channel transmission conditions.

While many secure systems operate under ideal conditions, e.g. where the communications link does not create conditions that could corrupt the transmitted information, in normal conditions the channel will create such problems.

In DES, the IV's are usually 64 bits long. But 64 bits is a long sequence to receive error free, especially over a communications channel and more so over a less than ideal communications channel. As stated above, such things as forward error correcting (FEC) codes are used in the prior art to increase the odds that the IV being used is accurate, but such methods add appreciably to overhead.

It is known from statistical analysis that if the length of IV were reduced, the probability of errors would decrease. However, as mentioned above, the security of an encryption method is related to length of IV. If the length were reduced to decrease probability of error in the transmitted IV for cryptographic synchronization or crypto sync, the security of the encryption would also decrease. This may be unacceptable.

U.S. Pat. No. 4,322,576 discusses IV's, their 64 bit length and cryptographic sync, and recognizes the space the IV's take up. Its solution is to place IV at a different place in the transmission to attempt to take advantage of what it calls lulls in the encryption/decryption process. However, IV is still 64 bits long.

U.S. Pat. No. 4,7575,536 discusses 64-bit IV's in DES, implemented in a digital signal processor (DSP) and operating in output feedback (OFB) mode, with a cycle length of $2^{64}$.

U.S. Pat. No. 5,195,136 discloses use of linear feedback shift registers with cipher block chaining mode for DES, and addresses errors caused by noisy channels, but does not address shortening the length of IV.

Therefore, there is a seemingly unsolveable dilemma, especially with respect to generating PN streams for use in securing data using block cipher techniques. Thus, there is real need in the art to decrease overhead associated with IV for initiating, maintaining and reacquiring cryptographic sync between transmitting and receiving units using a block cipher, but doing so without reduction in security, or at least, with an acceptable amount of decrease in security.

It is therefore a primary object of the present invention to provide an apparatus and method for reducing the overhead in a block cipher system without reducing the security of the PN stream or communication, and which improves over and solves the problems and deficiencies in the art.

Further objects, features, and advantages of the present invention include an apparatus and method as above-described which:

1. provides for late entry but with less overhead burden.
2. provides for late entry with less overhead burden but without reducing the overall cycle time of the block cipher.
3. is flexible and adaptable in its application and use, including both analog and digital uses and different uses of PN streams.
4. applies to a variety of block cipher and PRNG types and uses.
5. is especially useful when communicating information over a communications channel that is less than ideal with respect to possible corruption of the information being transmitted.
6. can reduce synchronization errors even in less than ideal communications channels.
7. can achieve and maintain cryptographic synchronization even when initialization vectors are partially or wholly destroyed by channel conditions or burst errors.
8. can be adapted to achieve varying degrees of fading protection.

These and other objects, features and advantages of the present invention will become more apparent with reference to the accompanying specification and claims.

SUMMARY OF THE INVENTION

The present invention includes a method for reducing overhead in a block cipher system. The initialization vector for the block cipher is selected to be of a bit length that is less than the bit length of the blocks which are processed by the block cipher. The IV therefore takes up less room when transmitted to the receiver, particularly with respect to situations where IV is repeated throughout the transmission to allow late entry synchronization. The IV is input to the block cipher and the difference in bits between IV and the block cipher is filled with other pseudo-randomly created bits.

To compensate for the concomitant decrease in security of the output of the block cipher caused by shortening of the length of IV, the method of the invention can include the use of cipher block chaining. The pseudo-random output based on the IV and a crypto variable or secret key that created a first pseudo-random number, would be fed into the input of the block cipher when creating the next pseudo-random number. Therefore, the next and subsequent pseudo-random numbers would depend both on the block cipher process, and also on the preceding pseudo-random number. This would statistically at least maintain, and in many cases increase, the overall cycle length of the block cipher, even though the IV is decreased in length. Once a new IV is generated, the process starts again.

The invention solves the problem of re-synchronizing an X-bit block cipher with an initialization vector of length N, where N can be substantially less than X, without compromising the security of the cipher or reducing its cycle length. It reduces the burden of late entry by introducing a technique to shorten the IV.

DETAILED DESCRIPTION OF PREFERRED EMBODIMENTS

Overview

To assist in a better understanding of the invention, a description of one embodiment or form the invention can take will now be set forth in detail. Frequent reference will be taken to the drawings. Reference numbers will sometimes be utilized to indicate certain parts or locations in the drawings. The same reference numbers will be used to indicate the same parts and locations throughout the drawings unless otherwise indicated.

This description will be in the context of encryption of information, and in particular, to the encryption of information using block cipher techniques. The information can be any of a variety of types, including data (e.g. numerical or text) or audio (e.g. voice), or combinations thereof.

Furthermore, the preferred embodiment is in the context of a block cipher that operates by receiving an initialization vector and which outputs blocks of X-bit length blocks of pseudo random numbers that are used to encrypt the actual information to be encrypted.

Structure of Preferred Embodiment

Figure 1:
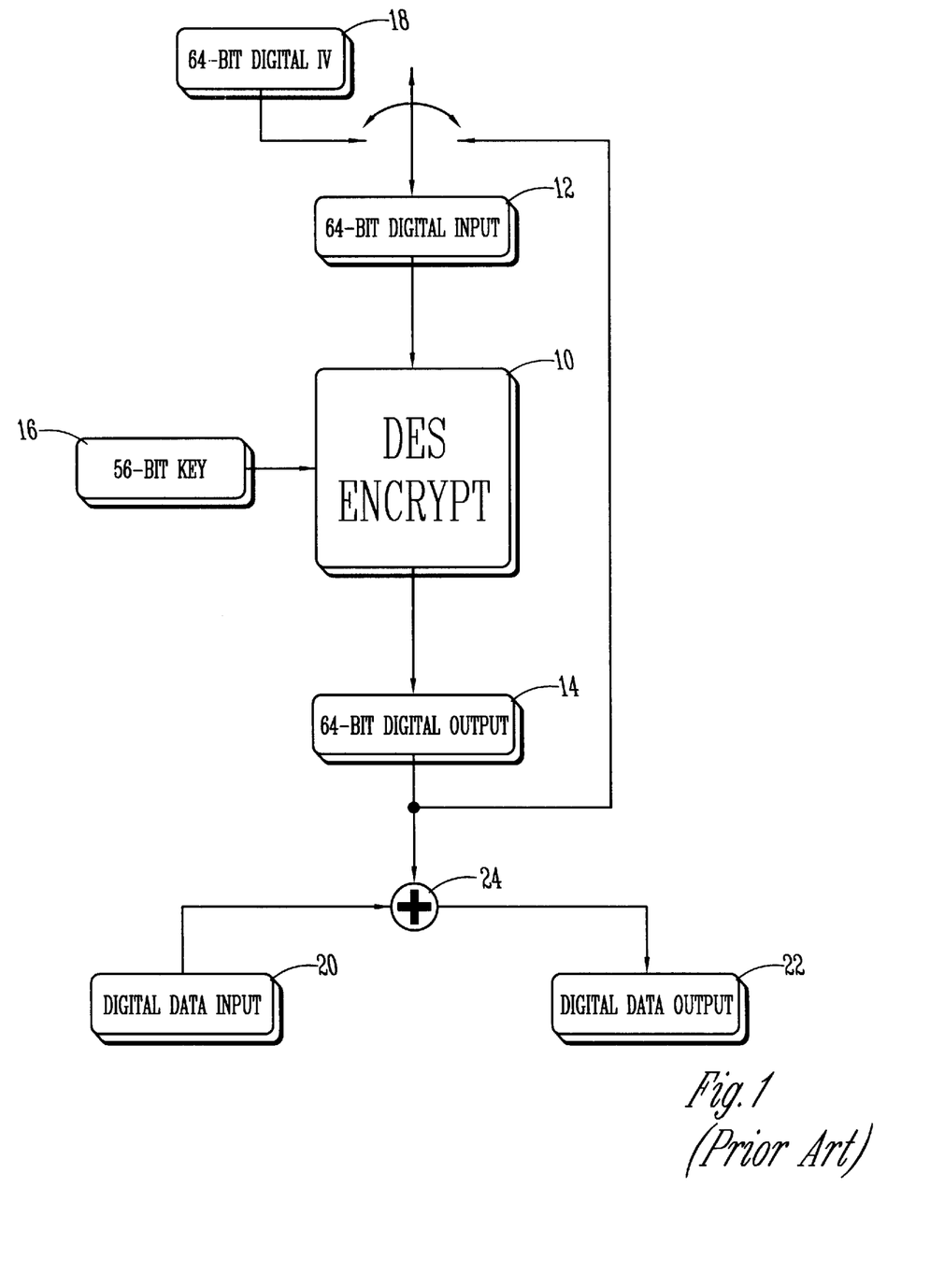
FIG. 1 is a block diagram depiction of a block cipher system utilizing DES in a digital encryption application according to the prior art.

FIG. 1 illustrates diagrammatically a conventional way of operation of a block cipher 10. Here block cipher 10 is the Data Encryption Standard (DES), such as is well known in the art. The details of the same will not be repeated here. As shown at reference number 12, cipher 10 receives a 64 bit input, and creates a 64 bit output 14. A 56 bit secret key or crypto variable 16 is also input to DES 10. Key 16 assists in preventing others from being able to know the pattern of output 14 as it is secret except to the authorized transmitter and receiver(s).

Conventional block cipher systems also use an initialization vector (IV) 18. IV 18 is the same length as the input and output of DES 10. It provides another variable to DES 10 to assist in the prevention of others from knowing or predicting the output 14 of DES 10. By methods well know in the art, output 14 essentially is a pseudo-random number stream created in 64 bit blocks. It has a relatively long overall cycle length, generally $2^{64}-1$, and therefore is considered highly secure from unauthorized persons predicting the pseudo-random sequence.

Thereafter, each 64-bit block at output 14 is combined with 64 bit blocks of the information that is to be encrypted (the digital data input 20) to create the encrypted output (digital data output 22). In this example, data input 20 is the real or ultimate plaintext, the actual digitized information to be secured, which otherwise would be decodable and understandable by an interloper. Data output 22 is the real or ultimate ciphertext, the encrypted ultimate plaintext (input 20) which then can be transmitted in highly secured form. The combination of data input 20 with output 14 of DES 10 is by exclusive OR (see reference numeral 24) of corresponding bits in the 64 bit blocks. Data output 22 is a 64 bit block.

To decrypt data output 22, the reverse of what has been described above is performed. The encrypted message is received in blocks. The receiver knows key 16. The encrypted blocks are fed as an input into DES 10. As is well known, decryption also requires that the receiver know precisely the initialization vector (IV) 18 for each block of encrypted data. With these things, DES 10 can essentially reconstruct the original pseudo random 64 bit long string for each block of ciphertext 22, conduct the reverse of exclusive OR, and extract the ultimate plaintext 20.

Figure 2:
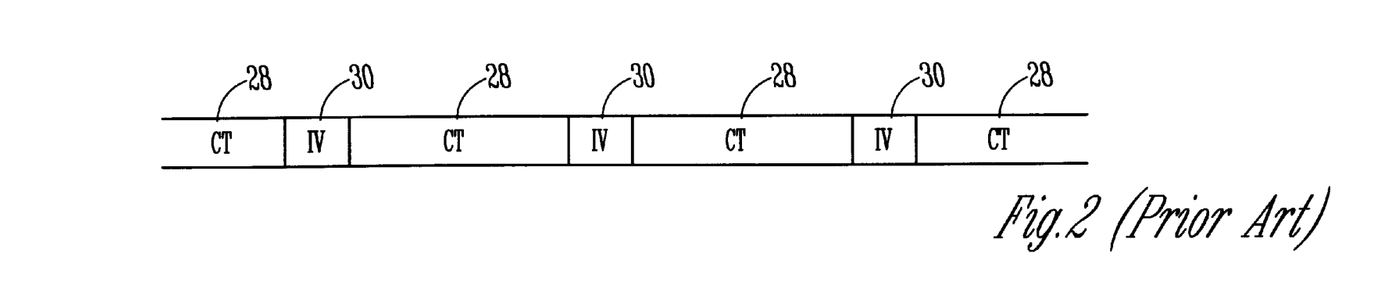
FIG. 2 is a diagrammatic depiction of a transmitted signal of encrypted information with intermittent data sections which include an initialization vector.

The conventional method of allowing a receiver or receivers to continuously know IV 18 is to transmit it between the transmitting device and any receiving device(s). FIG. 2 diagrammatically illustrates a conventional transmitted encrypted message 26. It is made up of sections 28 of encrypted information (ciphertext or CT) and intermittent data sections 30 of 64 bits of room or bandwidth that can include IV 18. Therefore, as is well known in the art, any receiving unit would look for IV 18 in the data sections to achieve crypto sync. It would do the same to maintain crypto sync. Also, it would do the same to reestablish or reenter crypto sync if ever lost during a transmitted message.

Figure 3:
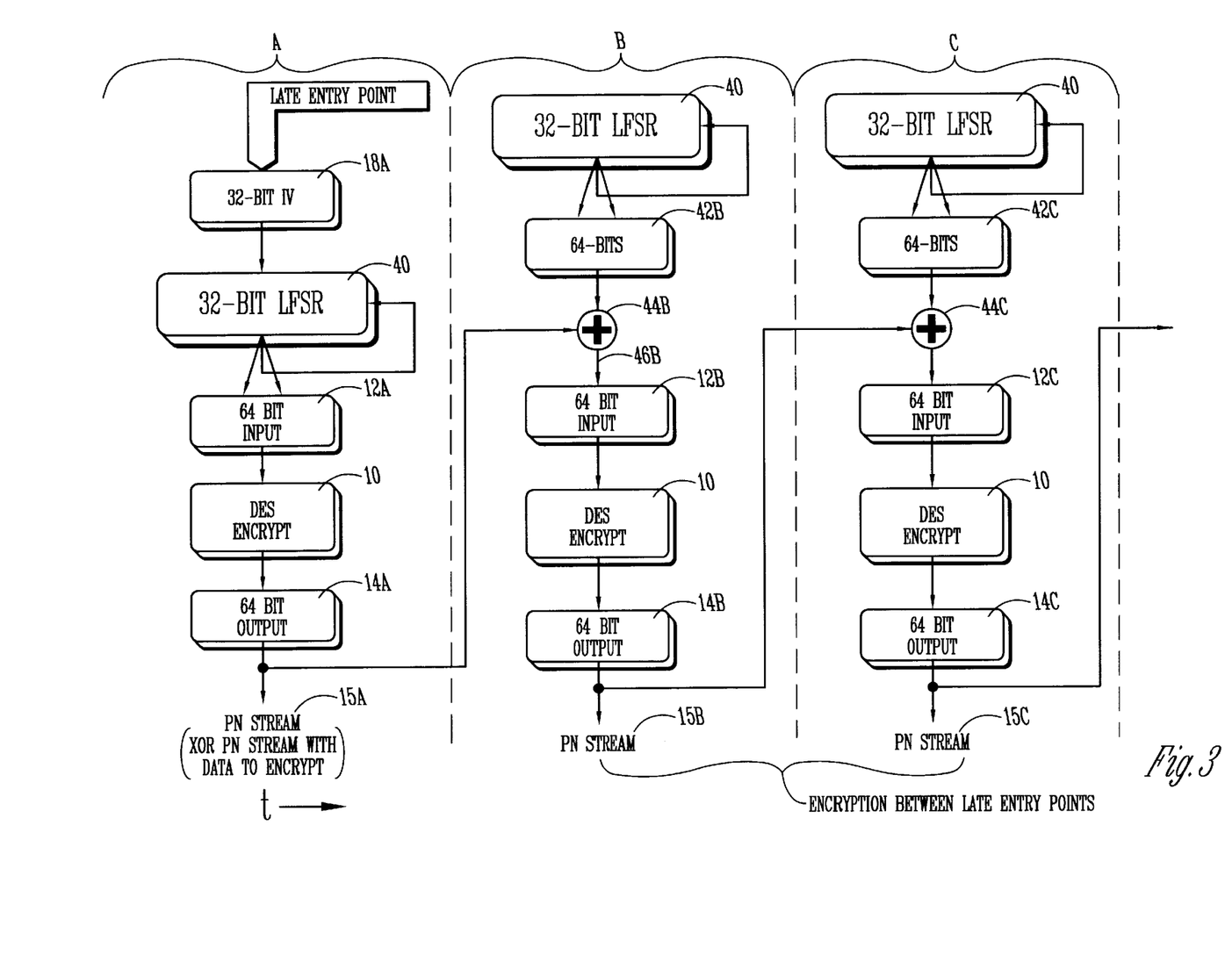
FIG. 3 is a flow chart illustrating in functional blocks a PRNG system according to a preferred embodiment of the present invention.

In the preferred embodiment, the system of FIGS. 1 and 2 are used, in modified form. By referring to FIG. 3, the preferred embodiment is illustrated functionally. DES 10 is used in what is well known in the art as cipher block chaining (CBC) mode. The first block of ciphertext is created as shown in the portion of FIG. 3 labeled A. A 64 bit input 12A is introduced into DES 10. A 64 bit output 14A produces a 64 bit block pseudo random number (PN) 15A which is then exclusive OR'ed with plaintext to encrypt that block of plaintext. The exclusive OR function, secret key, ultimate plaintext, and ultimate ciphertext are not shown in FIG. 3 for simplicity.

Figure 4:
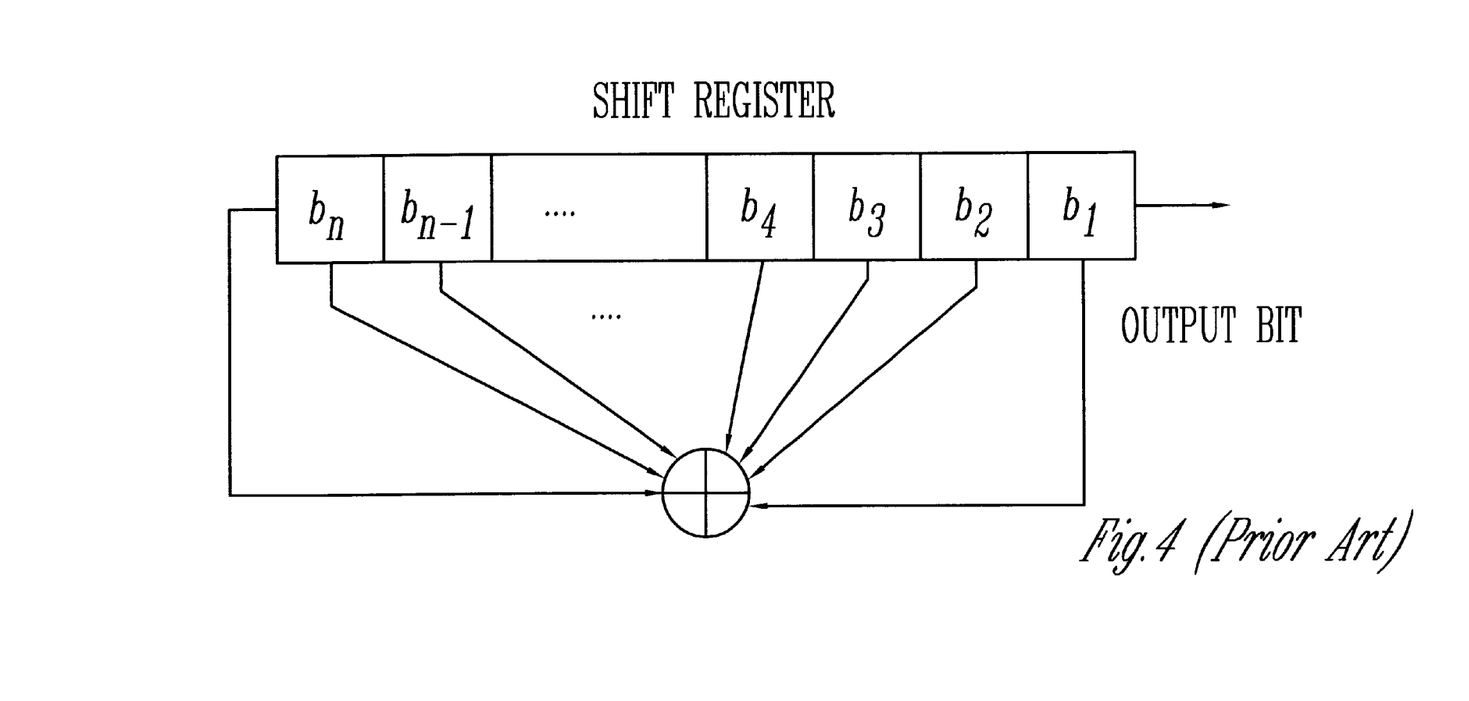
FIG. 4 is a block diagram of a linear feedback shift register as used with the preferred embodiment of the present invention.

The difference between FIG. 3, section A, and FIG. 1 is as follows. A linear feedback shift register (LFSR) 40 is used to create the 64 bit input 12A to DES 10. LFSR 40 is well known in the art. In the preferred embodiment, the polynomial formed from the elements of the tap sequence plus the constant 1 is a primitive polynomial mod 2 so that LFSR is a maximal length LFSR (see FIG. 4). Also, LFSR 40 is a 32 bit LFSR. As indicated at FIG. 3, IV 18A is 32 bits in length. When encryption begins, IV 18A is loaded into LFSR 40. LFSR must then be clocked 64 times, creating 64 bit input 12A out of 32 bit IV 18A plus 32 other pseudo random bits. DES 10 then operates to create its 64 bit output 14A.

Thus, section A of FIG. 3, corresponding to the first 64 bit block of ciphertext, is accomplished with a 32 bit IV 18A, instead of the normal 64 bit IV (see FIG. 1). The overhead taken up in the transmitted messages (FIG. 2) will thus be reduced because IV will be one-half as long. Thus, overhead is reduced and throughput of the encrypted message is increased.

FIG. 3 also illustrates how succeeding 64 bits of ciphertext are created. By referring to section B of FIG. 3, it can be seen that after the first 64 bit output 14A of DES 10 is completed, LFSR is again clocked 64 times, 32 times for 32 bit IV 18A, plus another 32 times to create a 64 bit value 42B. According to well known cipher block chaining (CBC) techniques, 64 bit value 42B is loaded into combiner 44B which combines it with the 64 bit output 14A of the preceding block. The combined value 46B (64 bits) becomes input 12B for DES 10 in section B of FIG. 3. Output 14B is a pseudo random 64 bit block that becomes PN 15B to convert the next 64 bit block of plaintext into ciphertext.

FIG. 3, section C, shows that the succeeding 64 bit block of plaintext is encrypted by clocking LFSR 40 once again 64 times to create 64 bit value 42C, which is combined with the preceding output 14B to create 64 bit input 12C for DES 10. The output 14C is a 64 bit PN 15C that is combined with the next 64 bits of plaintext to create the next 64 bits of ciphertext.

This sequence continues until the next IV 18B is received. At that time, the new IV 18B is fed to LFSR 40, and the process of FIG. 3, starting at section A, is started again.

Operation

The invention utilizes two commonly understood cryptographic tools: a block cipher, here DES, though any block cipher will work with this technique; and a linear feedback shift register (LFSR). Linear feedback shift registers are useful because they can generate a long PN stream. However, they are not secure because they are linear and completely predictable upon observing only a very small portion of the linear feedback shift register stream.

Here LFSR 40 is operated with a block cipher in such a way that a shorter length IV is used for late entry without sacrificing security or reducing the cycle length of the block cipher.

First, an integer N is chosen to be as large as possible, but still shorter than the block length of our cipher, which for DES is 64 bits. For purposes of illustration, N will be chosen to be 32. LFSR 40 is built which is N bits long and has a primitive polynomial as its feedback taps (see FIG. 4). This is a requirement for the LFSR to generate a PN stream which is of maximal length, and is well documented in the literature on this subject. An N-bit LFSR will produce a PN stream which has a cycle length of $2^N-1$. LFSR 40 is used to provide a plaintext keystream which will then be used as the input to block cipher 10. It should be noted that the "plaintext keystream" from LFSR 40 differs from the plaintext that is ultimately encrypted, as discussed above. The term "plaintext keystream" is used with LFSR 40 because it is the input to block cipher 10.

Block cipher 10 is operated in cipher block chaining (CBC) mode. In this mode, the first block is identical to electronic codebook (ECB) mode, which is the most commonly used mode of a block cipher. The first operation (section A is FIG. 3) takes a block of plaintext 12A, encrypts it with the block cipher 10, and produces a block of ciphertext 14A. However, all subsequent rounds operate differently from the first.

Subsequent blocks of block cipher 10 in CBC mode will take a new block of plaintext 42B from LFSR 40, but before encrypting it, will exclusive-or (XOR 44B) this plaintext 42B with the ciphertext block output 14A from the previous block before encrypting it. This has the desirable property of creating ciphertext which conceals any repetitive patterns that may exist in the plaintext. Furthermore, it creates a very long ciphertext cycle length, even if the plaintext repeats frequently or is a constant. In fact, it should be noted that if the plaintext consists of all zeros, then CBC mode is identical to OFB mode where the IV is all zeros.

Using LFSR 40 to produce a source of plaintext for block cipher 10, and then operating block cipher 10 in CBC mode on this plaintext, will yield a ciphertext output which has a cycle length that is at least as great as that which the block cipher is capable of producing in OFB mode, which for DES is about $2^{64}$. Actually, the cycle length will be greater than this, due to the addition of the LFSR to the overall operation. Suppose the block cipher has a block length of X and the LFSR is N bits long. Then under certain conditions, the overall cycle length of the ciphertext will be $2^{X}*(2^{N}-1)$. In any event, the cycle length of the ciphertext will never be less than that of the block cipher operating in output feedback mode, which is $2^{X}$.

Therefore, although the IV is shortened, the invention does not reduce the cycle length of the cipher, but instead can actually lengthen it (depending on the choice of N). The invention also allows re-synchronization of the cipher with the shorter N-bit IV instead of an X-bit IV. Recall that N is the length of the LFSR, X is the block length of the cipher, and N is less than X. The following example assumes X=64 and N=32.

Due to the fact that block cipher 10 is operating in CBC mode, there is no synchronization requirement other than to be certain that the plaintext is synchronized between transmitter and receiver. However, since the plaintext is provided by the output of LFSR 40, all that really needs to be done is make certain the LFSRs of the transmitter and receiver are synchronized. However, this is a simple task, since only the LFSR contents at a given time is needed to use as IV, and these contents are only N bits long.

Thus, begin by choosing some random N-bit value to load into N-bit LFSR 40. This N-bit value is sent over the channel from the transmitter to the receiver. Then begin PN generation by clocking the LFSR X times, so that it produces a block of plaintext for block cipher 10 to encrypt. Block cipher 10 is then used in CBC mode to encrypt the output of LFSR 40, such that each time a new block is ready to be encrypted, LFSR 40 is clocked X times to produce the plaintext for this block. This plaintext is then XORed with the ciphertext from the previous block, and the result encrypted, forming our new ciphertext.

When late entry is allowed, again choose a new random N-bit value, and start the above process all over again. In this way, complete resynchronization of the cipher is allowed with only an N-bit IV, instead of an X-bit IV. In the example given, the length of the IV is cut in half, yet the cycle length of the cipher is actually increased.

The preferred embodiment of the invention can be implemented as software on a Texas Instruments TMS320F206 digital signal processor. The block cipher 10 used is DES, which has a 64-bit block length. The LFSR 40 used is 32 bits long, which allows re-synchronization with a 32-bit IV instead of a 64-bit IV.

Options and Alternatives

It will be appreciated that the present invention can take many forms and embodiments. The true essence and spirit of this invention are defined in the appending claims, and it is not intended that the embodiment of the invention presented herein should limit the scope thereof.

For example, block cipher 10 can be DES or some other encryption method that uses a IV or its equivalent. If DES is used, it could be in a variety of modes, including CFB or OFB.

Alternatively, the PN stream created by LFSR 40 and block cipher 10 can be used in any application where a PN stream with a long overall cycle length is desirable or useable. One example is use as a rolling code in analog scrambling.

The statistical basis for the assumption that there is a higher probability of error the longer the IV is known in the art. See, for example, Lin, Shu and Costello, Daniel, "Error Control Coding: Fundamentals and Applications", Prentice Hall (1983), which is incorporated by reference herein. As an illustration, in a non-perfect communications channel, the error rate is approximately 0.01 or an error in 1 of every 100 bits. If IV is 64 bits long, there is a probability of 53% that the 64 bit IV will be received error-free. However, a 32 bit IV increases that probability to 73%.

Therefore, the designer of the system according to the present invention can choose how much fade resistance is desired by shortening the length of IV, and can do so knowing how much cycle length can be retained with respect to security. The mere shortening of IV would compromise security. However, with the present invention, security can be maintained to a significant level.

In another embodiment of the invention, a method for dealing with severe communications channel corruptions of IV is disclosed. Because it is necessary for both the transmitting device and the receiving device(s) to simultaneously know IV without any errors to allow cryptographic synchronization (crypto sync), any error in IV can cause loss of crypto sync. If fading or noise in a channel is substantial enough, more than just one or a few bits may be in error. In fact, the whole IV may be destroyed making crypto sync impossible.

It has been discussed above that it is known that the shorter the IV, the less probability of an error in its transmission. It has also been discussed that shortening IV would diminish security of the encryption system because of the shorter cycle time. The embodiment above addresses the security problem by using CBC mode block cipher operation and the LFSR in the manner disclosed. However, there are times when the need is great enough that IV could be shortened without needing to maintain cycle length.

Therefore, another embodiment according to the invention simply allows the designer or user to select the amount of channel fading protection needed, and correspondingly shorten the length of IV. It can be shortened by any amount. For example, instead of 64 bits in a normal DES encryption operation, it could be 32 bits. This increases the probability that an error-free IV will be received from 53% to 73%. The following percentage of error free IVs for a given IV length are: 16 bit IV=85%; 8 bit IV=92%; 4 bit IV=96%; 2 bit IV=98%; and 1 bit IV=99%. On the other hand, there may be times where channel problems are so severe that IV can be 0 (zero) bits long. This of course will not provide any security because DES will encrypt a constant number. In the extreme case of using a constant IV (such that the transmitted IV length is 0), there would be very little security. This is because at each iteration of DES, a constant value would be encrypted, which would result in a constant output. The DES, effectively a PSNG, would simply generate the same 64 bit value over and over again. This is obviously of no use in encrypting a message, as it is well known in the art that encryption with a constant value provides no security. However, no amount of channel fading will affect crypto sync because IV will always be known and the same.

Conversely, there may be times when security is very important and the channel conditions are very good or ideal. In those cases an IV of 64 bits might be used.

Therefore, there is a need for flexibility in balancing the need for accuracy in transmitted IV versus security. By adjusting the length of IV according to this balancing, this need can be addressed.

As discussed earlier, the prior art tries to ensure accuracy in the transmitted IV by using forward error correcting (FEC) codes. This adds overhead to the system, which the present invention tries to avoid. However, there are cases where data burst errors so corrupt IV (or even destroy it) that correction schemes may not be sufficient.

An example of error detection is described at Lin & Costello, previously cited, which is incorporated by reference herein.

The concept of coasting is known in the art. To further enhance error resistance, coasting can be applied with a shortened IV. Coasting essentially ignores an IV received in error. In order to allow coasting, IVs must be generated in a manner which is predictable to both the transmitter and the receiver. This can be accomplished by using any number of techniques. One example is to use a LFSR to generate the IVs. Once a receiver achieves crypto sync, it will maintain the same until it determines that it is no longer properly synchronized. Without coasting, this loss of crypto sync would happen whenever an IV is received in error. With coasting, the system passes through an erroneous IV, using the fact that the system is able to predict the correct IV instead. Thus crypto sync is maintained by identifying an erroneous IV and then predicting the correct IV and using the predicted correct value.

The combination of a shortened IV and coasting will provide an enhanced error resistance in a secure communication system which must rely on error-free transmission and reception of IV.

The above concepts are discussed relative to digital encryption methods. It is also applicable to analog secure communications systems. Examples are Transcrypt International SC20-460 analog rolling code frequency inversion scrambler, which includes certain aspects of coasting. Another example is Transcrypt International SC20-500 analog Phoenix scrambler which includes certain aspects of late entry.

A determination of the appropriate length for the IV can depend on a number of factors. Some examples of such factors are:

1) availability of overhead in channel to allow more or less IV bits.
2) bit error probability of channel.
3) rate at which IV's are consumed by late entry scheme.
4) desired security level of system.

Other factors will be appreciated by those skilled in the art. Certain factors will apply to certain situations. The decision of how much IV is to be shortened can depend upon the factors mentioned above. Although selection of IV length can vary anywhere from 0 to X (the length of blocks processed by the block cipher, which here is 64 bits), one range to consider is between 0 and 32 bits. Any IV length less than 16 bits represents a substantial security decrease. Some situations would operate reasonably with essentially no security protection but essentially no error risk, i.e. a 0 bit length IV. Others need a substantial security level with a substantial fading protection, i.e. 32 bits. The balancing between security and fading protection varies somewhat proportionally when considering IV lengths between 0 and 32 bits.

An example of coasting can be found at U.S. Pat. No. 4,893,339, entitled "Secure Communication System", which is incorporated by reference herein.

What is claimed is:

1. A method of reducing overhead in a block cipher system which outputs cipher text in X bit blocks, but without reduction in overall cycle length, comprising:
    a) creating an initialization word of N bits, where N<X;
    b) loading the initialization word into a linear feedback shift register of N bits in length;
    c) clocking the linear feedback shift register X times;
    d) inputting the output of the linear feedback shift register into the block cipher to create a first pseudo-random number of X bits;
    e) clocking the linear feedback shift register another X times;
    f) combining the output of the linear feedback shift register with the first X bit pseudo-random number;
    g) inputting the combination into the block cipher to create a second pseudo-random number of X bits dependent in part on the first pseudo-random number;
    h) clocking the linear feedback shift register another X times;
    i) combining the output of the linear feedback shift register with the preceding pseudo-random number;
    j) inputting the combination into the block cipher to create a succeeding pseudo-random number of X bits dependent in part on the preceding pseudo-random number;
    k) repeating steps h–j until a new initialization word of N bits is sent to the linear feedback shift register;
    l) then repeating steps b–k.

2. The method claim 1 further comprising the step of combining the X bit pseudo-random number stream with data to create a fist encrypted block of data X bits in length.

3. The method of claim 1 further comprising combining the second pseudo-random number with data to create a second encrypted block.

4. The method of claim 1 wherein the initialization word is an initialization vector.

5. The method of claim 1 wherein the block cipher is DES operating in feedback mode.

6. The method of claim 1 wherein N is less than X.

7. The method of claim 1 wherein 0<N<X.

8. The method of claim 1 wherein X=64.

9. The method of claim 1 wherein N=0 to 32.

10. The method of claim 1 wherein the linear feedback shift register is based on a primitive polynomial.

11. The method of claim 1 wherein the block cipher operates in cipher block chaining mode.

12. The method of claim 1 further comprising transmitting the initialization words.

13. The method of claim 1 further comprising the block cipher includes a crypto variable.

14. The method of claim 1 further comprising outputting the pseudo-random outputs of the block cipher to an external device, the external device using the outputs of the block cipher as a pseudo-random number generator.

15. A method of pseudo random number generation comprising: providing an initial initialization value of N bits where N<X; encrypting the initial value with X−N other values in CBC mode to create blocks of N bit pseudo-random numbers, each succeeding pseudo-random number depending on the preceding.

16. The method of claim 15 further comprising repeating upon receipt of the next initialization value.

17. The method of claim 15 further comprising the step of using the pseudo-random numbers to secure a communication by one of scrambling or encryption.

18. The method of claim 17 further comprising receiving the scrambled or encrypted communication and performing the reverse functions on the communication to descramble or decrypt the same.

19. The method of claim 15 further comprising transmitting to one or more receivers the initialization value.

20. An apparatus for producing a stream of pseudo-random numbers with adjustable length initialization vectors, comprising:

a digital signal processor;

the digital signal processor including a linear feedback shift register of N bits in length; and a block cipher that operates on words X bits in length in cipher block feedback mode.

21. The apparatus of claim 20 the digital signal processor further comprising:

a first output for outputting a pseudo-random number;

a data source;

an encrypted output;

an XOR component, the XOR component operatively connected to the data source, the first output, and the encrypted output, the XOR component combining data from the data source with a pseudo-random number from the first output to produce an encrypted number at the encrypted output.

22. The apparatus of claim 20 further comprising:

an output for outputting a pseudo-random number;

an audio or video source for providing an audio or video signal;

a scrambler operatively connected to the output and the audio or video source, the scrambler receiving the pseudo-random number and the audio or video signal and scrambling the audio or video signal.

23. A method to reduce overhead in a block cipher system without reducing overall cycle length comprising:

generating a first IV of N bits for a block cipher having input and output clocks of X bits where N is less than X;

seeding a block cipher with the first IV;

operating the block cipher in cipher block chaining mode with a crypto key, to output an X bit key stream dependent on the key and on IV.

24. The method of claim 23 further comprising generating a second IV of N bits, seeding the block cipher with the second IV, and operating the block cipher in cipher block chaining mode with a crypto key to output an X bit key stream block dependent on the key and the second IV and the output of the first IV.

25. The method of claim 23 wherein the value N is selected from the factors including (a) availability of overhead in channel to allow more or less IV bits, (b) bit error probability of channel, (c) rate at which IV's are consumed by late entry scheme, and (d) desired security level of system.

26. The method of claim 23 further comprising the steps of predicting the correct value of IV, comparing the predicted value of IV with the received value of IV, and disregarding the received value and using the predicted value of IV if errors in the received IV are detected.

27. The method of claim 23 wherein N is within the range of 0 to 32.

28. The method of claim 27 wherein N is within the range of 16 to 32.

* * * * *